US011585995B2

(12) United States Patent
Murthy et al.

(10) Patent No.: US 11,585,995 B2
(45) Date of Patent: Feb. 21, 2023

(54) MATRIX MATERIAL FOR ROLLABLE OPTICAL FIBER RIBBONS

(71) Applicant: Sterlite Technologies Limited, Gurgaon (IN)

(72) Inventors: Venkatesh Murthy, Gurgaon (IN); Kishore Chandra Sahoo, Gurgaon (IN); Sravan Kumar, Gurgaon (IN); Atul Mishra, Gurgaon (IN); Vikas Shukla, Gurgaon (IN)

(73) Assignee: Sterlite Technologies Limited, Gurgaon (IN)

( * ) Notice: Subject to any disclaimer, the term of this patent is extended or adjusted under 35 U.S.C. 154(b) by 0 days.

(21) Appl. No.: 17/256,016

(22) PCT Filed: Oct. 30, 2019

(86) PCT No.: PCT/IN2019/050798
§ 371 (c)(1),
(2) Date: Dec. 24, 2020

(87) PCT Pub. No.: WO2020/095315
PCT Pub. Date: May 14, 2020

(65) Prior Publication Data
US 2021/0263248 A1  Aug. 26, 2021

(30) Foreign Application Priority Data
Nov. 5, 2018 (IN) .............................. 201811041767

(51) Int. Cl.
*G02B 6/44* (2006.01)
*G02B 6/02* (2006.01)

(52) U.S. Cl.
CPC ............. *G02B 6/4403* (2013.01); *G02B 6/44* (2013.01); *G02B 6/02* (2013.01)

(58) Field of Classification Search
CPC ........... G02B 6/02; G02B 6/44; G02B 6/4403
See application file for complete search history.

(56) References Cited

U.S. PATENT DOCUMENTS

| 7,295,741 B2 * | 11/2007 | Sako | G02B 6/0281 |
| | | | 385/127 |
| 9,939,599 B2 * | 4/2018 | Blazer | G02B 6/4404 |
| 2017/0115461 A1 * | 4/2017 | Namazue | G02B 6/4405 |

OTHER PUBLICATIONS

DSM, DeSolite Optical Fiber Coatings, Mar. 2007, DSM, DeSolite 3474-3-14 Product Date, pp. 1-4 (Year: 2007).*
Farnell (Polyurethane Resin datasheet, Jun. 25, 2012, pp. 1-3) (Year: 2012).*

* cited by examiner

*Primary Examiner* — Ryan A Lepisto
(74) *Attorney, Agent, or Firm* — Steven R. Fairchild; Michael J. Pennington

(57) ABSTRACT

The present disclosure provides a matrix material for a rollable optical fibre ribbon. The rollable optical fibre ribbon includes a plurality of optical fibres and the matrix material. In addition, each of the plurality of optical fibres is placed parallel to other optical fibres of the plurality of optical fibres. Further, the matrix material joins the plurality of optical fibres. Furthermore, the matrix material has different glass transition temperature at different pressures.

8 Claims, 5 Drawing Sheets

MATRIX MATERIAL FOR ROLLABLE OPTICAL FIBER RIBBONS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of optical fibre ribbons and, in particular, the present disclosure relates to a matrix material for a rollable optical fibre ribbons.

Description of the Related Art

Optical fibre cables have secured an important position in building a network of modern communication systems across the world. One such type of optical fibre cables are optical fibre ribbon cables. These optical fibre ribbon cables include a plurality of optical fibres ribbons. Each optical fibre ribbon includes a number of optical fibres placed adjacent and bonded together side by side with a suitable material. Some optical fibre ribbon cables are designed for large data transmission which requires large number of optical fibres inside the optical fibre ribbon cable. These optical fibre ribbons may be held inside a buffer tube which may be covered by additional layers such as water blocking layers, armoring layer, sheathing layer and the like.

The currently available optical fibre ribbons have several drawbacks. Conventionally, the prior art optical fibre ribbons have flat surface and are arranged in vertical and horizontal manner inside the buffer tube of the optical fibre ribbon cables. This kind of arrangement inherently takes more space inside the cable. This leads to a larger diameter of the ribbon type optical fibre cable. Moreover, this leads to higher cable weight which further attracts problems during manufacturing, transporting and installation. These problems have more prominent effects in the optical fibre ribbon cables having large number of optical fibres/optical fibre ribbons. Further, the fibres in a ribbon are bonded with such material which resists the movement of the ribbon in the optical fibre ribbon cable. However, the material used for the ribbon does not have the desired flexible characteristics. This leads to the use of less number of ribbons in the optical fibre ribbon cable. In light of the above stated discussion, there exists a need for a material for optical fibre ribbons which overcomes the drawbacks of conventionally known optical fibre ribbons.

BRIEF SUMMARY OF THE INVENTION

In an aspect, the present disclosure provides a rollable optical fibre ribbon. The rollable optical fibre ribbon includes a plurality of optical fibres and a matrix material. In addition, each of the plurality of optical fibres is placed parallel to other optical fibres of the plurality of optical fibres. The matrix material joins the plurality of optical fibres. In addition, the matrix material has at least one of glass transition temperature of about −18 degree Celsius at pressure of about 1000 mega-Pascal or glass transition temperature of about −28 degree Celsius at pressure of about 100 mega-Pascal.

A primary object of the present disclosure is to provide a matrix material for a rollable optical fibre ribbon.

Another object of the present disclosure is to provide the matrix material having high elongation with fast cure speed.

Yet another object of the present disclosure is to provide the matrix material with excellent cured film stability.

Yet another object of the present disclosure is to provide the matrix material for providing high flexibility to the rollable optical fibre ribbon.

In an embodiment of the present disclosure, the rollable optical fibre ribbon is defined by at least one corrugated surfaces.

In an embodiment of the present disclosure, pitch of the rollable optical fibre ribbon is about 250 microns.

In an embodiment of the present disclosure, the matrix material of the rollable optical fibre ribbon is applied in a form of a liquid coating. In addition, the liquid coating of the matrix material has at least one of viscosity of about 9900 milli-Pascal second at temperature of about 25 degree Celsius or density of about 1110 kilogram per cubic meter at temperature of about 23 degree Celsius.

In an embodiment of the present disclosure, the liquid coating of the matrix material is cured by exposure of the matrix material to ultraviolet radiation to form a cured coating of the matrix material.

In an embodiment of the present disclosure, the matrix material has at least one of secant modulus of about 49 mega-Pascal at strain of about 2.5%, tensile strength of about 15 mega-Pascal or degree of cure of about 0.5 at ultraviolet radiation of about 95% of secant modulus.

In an embodiment of the present disclosure, the matrix material has at least one of 75 micron film that produces 0.2 micro liter per gram hydrogen in air at temperature of about 80 degree Celsius, and water resistant property. In addition, the matrix material with 250 micron film absorbs 3% of water in 24 hours.

In an embodiment of the present disclosure, the matrix material has at least one of viscosity in range of about 10000 milli-Pascal second to 12000 milli-Pascal second at first temperature range of about 20 degree Celsius to 30 degree Celsius and viscosity in range of about 0 milli-Pascal second to 2000 milli-Pascal second at second temperature range of about 50 degree Celsius to 60 degree Celsius.

In an embodiment of the present disclosure, the matrix material has constant cure speed at ultraviolet radiation in range of about 0.5 joule per square centimeter to 1 joule per square centimeter.

In an embodiment of the present disclosure, the matrix material is a curable ultraviolet acrylate.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
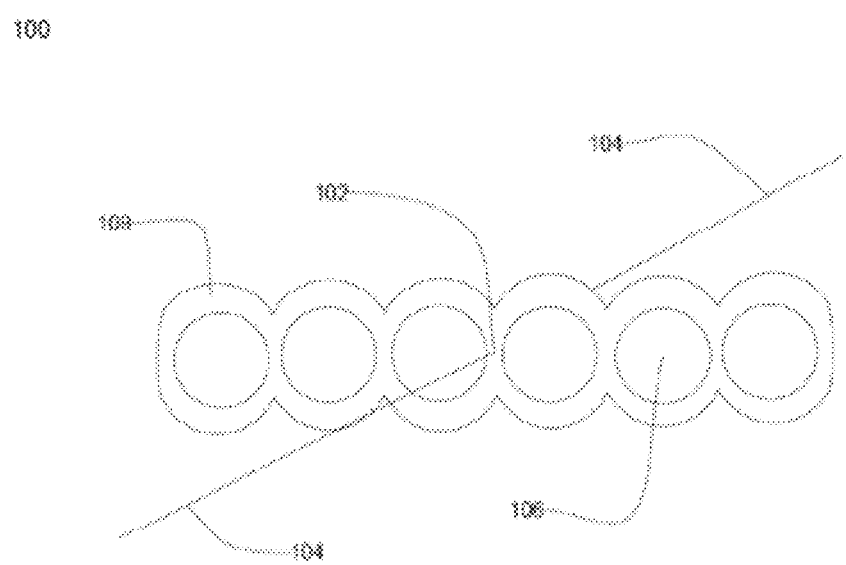
FIG. 1 illustrates a cross sectional view of a rollable optical fibre ribbon with matrix material, in accordance with various embodiments of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. Rollable optical fibre ribbon.
102. Geometrical centre.
104. Longitudinal axis.
106. Plurality of optical fibres.
108. Matrix material.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross sectional view of a rollable optical fibre ribbon 100 with a matrix material 108, in accordance with various embodiments of the present disclosure. The rollable optical fibre ribbon 100 is defined by a longitudinal axis 104 passing through a geometrical centre 102 of the rollable optical fibre ribbon. In general, longitudinal axis is an imaginary axis along the lengthwise direction of the figure or body, usually passing through its center of gravity or geometrical center.

In an embodiment of the present disclosure, the rollable optical fibre ribbon 100 has pitch of about 250 microns. In another embodiment of the present disclosure, pitch of the rollable optical fibre ribbon 100 may vary.

The rollable optical fibre ribbon 100 includes a plurality of optical fibres 106. In addition, each of the plurality of optical fibres 106 is placed adjacent to another optical fibre of the plurality of optical fibres 106. In an embodiment of the present disclosure, each of the plurality of optical fibres 106 is positioned along the longitudinal axis 104 of the rollable optical fibre ribbon 100. In an embodiment of the present disclosure, each of the plurality of optical fibres 106 is parallel to other optical fibres of the plurality of optical fibres 106. In general, optical fibre is used for transmitting information as light pulses from one end to another. In addition, optical fibre is a thin strand of glass or plastic capable of transmitting optical signals. Further, optical fibre is configured to transmit large amount of information over long distances. Furthermore, optical fibre includes a core region and a cladding region. The core region is an inner part of optical fibre and the cladding section is an outer part of optical fibre. In addition, the cladding region surrounds the core region.

The rollable optical fibre ribbon 100 includes the plurality of optical fibres 106. In addition, each of the plurality of optical fibres 106 is coated by the matrix material 108. In an embodiment of the present disclosure, the matrix material 108 imparts flexibility to the rollable optical fibre ribbon 100. In general, flexibility may be referred to the ability of any material to undergo bending without any cracks or other failures when an external force is applied to it. The matrix material 108 refers to a material with which the rollable optical fibre ribbon 100 is manufactured or coated.

In an embodiment of the present disclosure, the matrix material 108 is a curable ultraviolet acrylate. In another embodiment of the present disclosure, the matrix material 108 may be any suitable material of the like. The curable ultraviolet acrylate is a special kind of material having pre-defined flexibility. The matrix material 108 brings flexibility to the rollable optical fibre ribbon 100. The curable ultraviolet acrylate is soft material having high elongation along with fast cure speed. In addition, fast cure speed of the curable ultraviolet acrylate leads to improvement in productivity of the rollable optical fibre ribbon 100. In general, curing refers to toughening or hardening of the material by cross-linking of polymer chains, brought about by electron beams, heat or chemical additives. In addition, the process of activating additives by ultraviolet radiation is called ultraviolet cure.

The matrix material 108 over the plurality of optical fibres 106 is characterized by glass transition temperature. In an embodiment of the present disclosure, the matrix material 108 has glass transition temperature of about −18 degree Celsius at pressure of about 1000 mega-Pascal. In another embodiment of the present disclosure, glass transition temperature of the matrix material 108 at pressure of about 1000 mega-Pascal may vary. In an embodiment of the present disclosure, the matrix material 108 has glass transition temperature of about −28 degree Celsius at pressure of about 100 mega-Pascal. In another embodiment of the present disclosure, glass transition temperature of the matrix material 108 at pressure of about 100 mega-Pascal may vary. In general, glass transition is gradual and reversible transition in amorphous materials, from a hard and relatively brittle "glassy" state into a viscous or rubbery state as the temperature is increased.

In an embodiment of the present disclosure, the matrix material 108 is used for up jacketing of the plurality of optical fibres 106 having diameter in range of about 400 micron to 900 microns. In addition, up jacketing of the plurality of optical fibres 106 with the matrix material 108 provides flexibility to the plurality of optical fibres 106.

In an embodiment of the present disclosure, the matrix material 108 is applied in a form of a liquid coating to embed the plurality of optical fibres 106. The liquid coating of the matrix material 108 is characterized by viscosity. In an embodiment of the present disclosure, the liquid coating of the matrix material 108 has viscosity of about 9900 milli-Pascal second at temperature of about 25 degree Celsius. In another embodiment of the present disclosure, viscosity of the liquid coating of the matrix material 108 may vary. In general, viscosity of a fluid is the measure of its resistance to gradual deformation by shear stress or tensile stress. In addition, the liquid coating of the matrix material 108 is characterized by density. In an embodiment of the present disclosure, the liquid coating of the matrix material 108 has density of about 1110 kilogram per cubic meter at temperature of about 23 degree Celsius. In another embodiment of the present disclosure, density of the liquid coating of the matrix material 108 may vary.

Further, the liquid coating of the matrix material 108 is cured by exposure of the matrix material 108 to curing radiation. In an embodiment of the present disclosure, the liquid coating of the matrix material 108 is cured by ultraviolet radiation. The liquid coating of the matrix material 108 is cured for affixing the plurality of optical fibres 106 in ribbon configuration. In addition, the liquid coating of the matrix material 108 adheres to the plurality of optical fibres 106 after curing by ultraviolet radiation. Further, process forms a cured coating of the matrix material 108 on the plurality of optical fibres 106.

Furthermore, the matrix material 108 is characterized by secant modulus. In an embodiment of the present disclosure, the matrix material 108 has secant modulus of about 49 mega-Pascal at 2.5% strain. In another embodiment of the present disclosure, secant modulus of the matrix material 108 may vary. In general, secant modulus is the slope of a line drawn from the origin of the stress-strain diagram and intersecting the curve at the point of interest. In addition, secant modulus describes the stiffness of the matrix material 108 in the inelastic region of the stress strain diagram. In an embodiment of the present disclosure, degree of cure for the matrix material 108 is about 0.5 at ultraviolet radiation of about 95% of secant modulus. In another embodiment of the present disclosure, degree of cure the matrix material 108 may vary. In general, ultraviolet dose is the measure of the amount of germicidal light that is absorbed by a particle as it passes through an ultraviolet system. Further, the matrix material 108 over the plurality of optical fibres 106 is tested at 23 degree Celsius and at 50% R.H. Also, the matrix material 108 is characterized by tensile strength. In an embodiment of the present disclosure, the matrix material 108 has tensile strength of about 15 mega-Pascal. In another embodiment of the present disclosure, tensile strength of the matrix material 108 may vary. In general, tensile strength is defined as resistance of a material to breaking under tension.

Moreover, the matrix material 108 is characterized by elongation. In an embodiment of the present disclosure, the matrix material 108 has about 55 percent elongation. In another embodiment of the present disclosure, elongation of the matrix material 108 may vary. In general, amount of extension of an object or material under stress, usually expressed as a percentage of the original length.

Also, the matrix material 108 is water resistant. In an embodiment of the present disclosure, the matrix material 108 with 250 micrometer films absorbs 3.0% water in 24 hours. In another embodiment of the present disclosure, the matrix material 108 may absorb any suitable percentage of water with 250 micro meter films of coating in 24 hours. In an embodiment of the present disclosure, the matrix material 108 having 75 micrometer films produces 0.2 microliter per gram hydrogen in air at temperature of about 80 degree Celsius.

In an embodiment of the present disclosure, the matrix material 108 is manufactured using fine filtration techniques to minimize particulate matter. In another embodiment of the present disclosure, the matrix material 108 is manufactured using any suitable technique of the like. In addition, the matrix material 108 is manufactured using fine filtration techniques to ensure high strength and uniform product performance.

In an embodiment of the present disclosure, the matrix material 108 is stored in containers at temperatures range of about 15 degree Celsius and 30 degree Celsius. In another embodiment of the present disclosure, temperature at which the matrix material 108 is stored in containers may vary. In addition, containers used for the storage of the matrix material 108 are ultraviolet opaque. Further, ultraviolet opaque containers allow air to diffuse through plastic that prevents premature gelation.

In an embodiment of the present disclosure, the matrix material 108 stored in the ultraviolet opaque containers have a shelf life of about 18 months from the manufactured date. In an embodiment of the present disclosure, the matrix material 108 is formulated with multifunctional acrylate which causes skin and eye irritation and/or skin sensitization.

Figure 2:
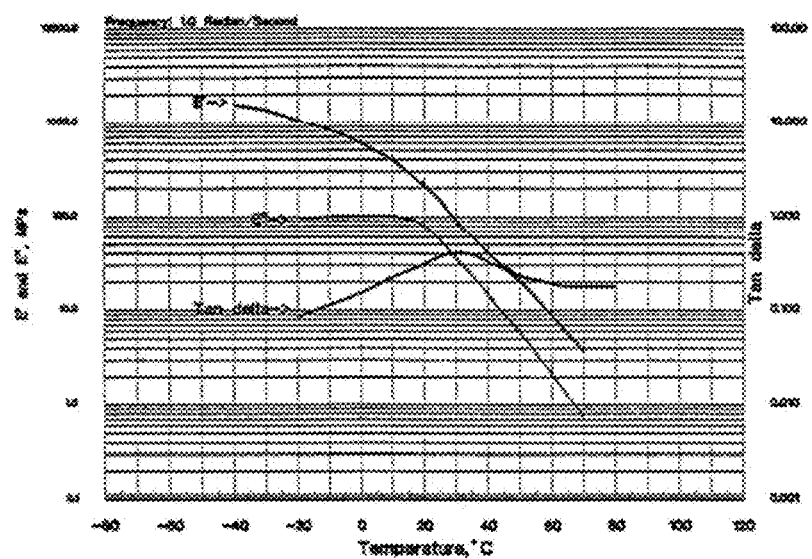
FIG. 2 illustrates a graph showing dynamic mechanical analysis of the matrix material, in accordance with an embodiment of the present disclosure.

FIG. 2 illustrates a graph showing the dynamic mechanical analysis of the matrix material 108, in accordance with an embodiment of the present disclosure. In general, dynamic mechanical analysis is a technique used to study and characterize materials. In addition, dynamic mechanical analysis of the matrix material 108 is used to study viscoelastic behavior of the material. Further, dynamic mechanical analysis is used for the measurement of glass transition temperature of the matrix material 108. In an embodiment of the present disclosure, the matrix material 108 has glass transition temperature of about −18 degree Celsius at pressure of 1000 mega-Pascal (as shown in FIG. 2). In an embodiment of the present disclosure, the matrix material 108 has glass transition temperature of about −28 degree Celsius at pressure of 100 mega-Pascal (as shown in FIG. 2). In general, glass transition temperature of material characterizes range of temperatures over which glass transition occurs.

Figure 3:
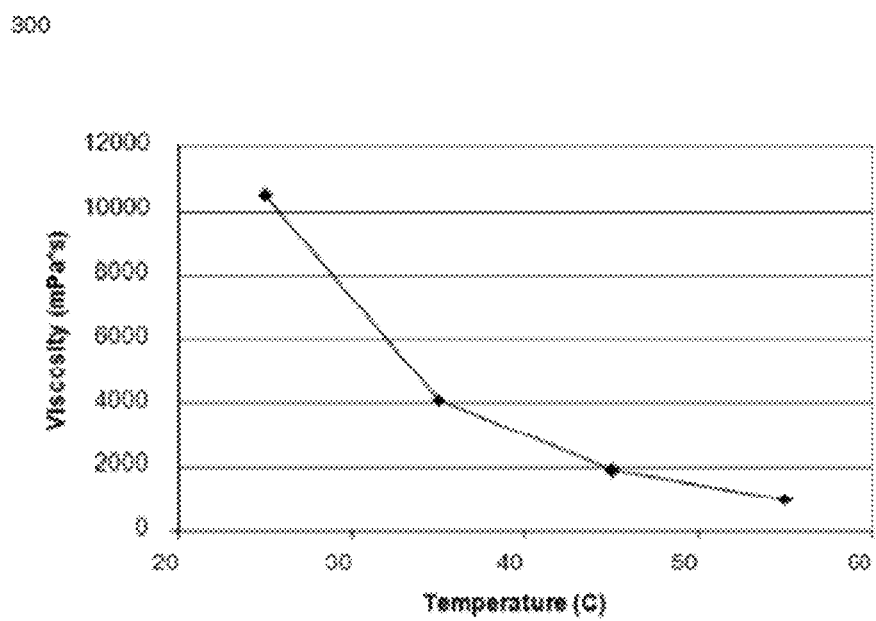
FIG. 3 illustrates viscosity versus temperature graph for the matrix material, in accordance with an embodiment of the present disclosure.

FIG. 3 shows viscosity versus temperature graph of the matrix material 108, in accordance with an embodiment of the present disclosure. X-axis of graph represents temperature in degree Celsius. In addition, Y-axis of graph represents viscosity of the matrix material 108. In an embodiment of the present disclosure, viscosity of the matrix material 108 is inversely proportional to the temperature. In general, viscosity of a fluid is the measure of its resistance to gradual deformation by shear stress or tensile stress. Further, viscosity versus temperature graph shows the continuous decrease of viscosity with increase of temperature. In an embodiment of the present disclosure, viscosity of the matrix material 108 decreases linearly with increase of temperature. In addition, viscosity of the matrix material 108 lies in range of about 10000 milli-Pascal second and 12000 milli-Pascal second at first temperature range of about 20 degree Celsius to 30 degree Celsius (as shown in FIG. 3). In addition, viscosity of the matrix material 108 lies in range of 0 milli-Pascal second to 2000 milli-Pascal second at second temperature range of about 50 degree Celsius to 60 degree Celsius (as shown in FIG. 3).

Figure 4:
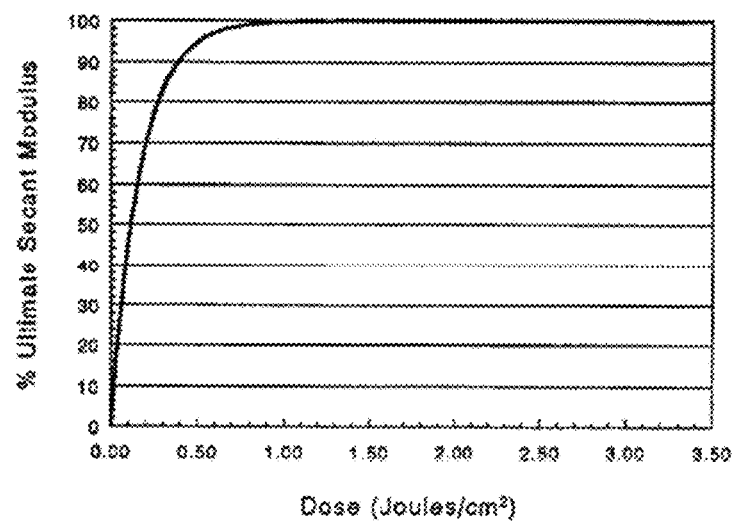
FIG. 4 illustrates a graph showing cure speed of the matrix material, in accordance with an embodiment of the present disclosure.

FIG. 4 illustrates graph showing cure speed for the matrix material 108, in accordance with an embodiment of the present disclosure. X-axis of graph represents dose of ultraviolet radiation in Joules per square centimeter. In addition, Y-axis of graph represents percentage of secant modulus. Further, graph shows that cure speed of the matrix material 108 is zero initially then it increases gradually and then it gets constant at 100 percent of secant modulus. In an embodiment of the present disclosure, cure speed of the matrix material 108 is constant at ultraviolet radiation in range of about 0.50 joule per square centimeter to 1.00 joule per square centimeter.

Figure 5:
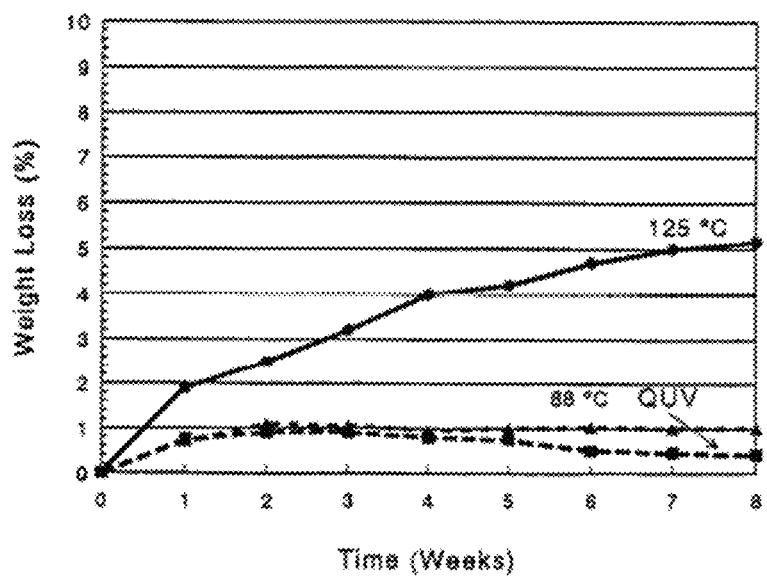
FIG. 5 illustrates a graph showing accelerated aging of the matrix material, in accordance with an embodiment of the present disclosure.

FIG. 5 illustrates graph showing accelerated aging of the matrix material 108, in accordance with an embodiment of the present disclosure. X-axis represents time in weeks and y-axis represents weight loss in percentage. In general, accelerated aging is an artificial procedure for establishing the lifespan or shelf life of a product in expedited manner. In addition, percentage of weight loss of the matrix material 108 increases with increase of time. Further, accelerated graph shows that in first week percentage of weight loss increases from 0 to 2. Furthermore, percentage of weight loss reaches up to 5 percent of original weight at 125 degree Celsius in seven weeks. In an embodiment of the present disclosure, percentage of weight loss of the matrix material 108 increases linearly.

The present disclosure provides numerous advantages over the prior art. The present disclosure provides a matrix material for rollable optical fibre ribbons. In addition, the matrix material has high elongation with fast cure speed. Further, the matrix material has excellent cured film stability.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A rollable optical fibre ribbon comprising:
a plurality of optical fibres, wherein each of the plurality of optical fibres is placed parallel to other optical fibres of the plurality of optical fibres; and
a matrix material, wherein the matrix material is applied partially between adjacent fibres of the plurality of optical fibres to join the plurality of optical fibres intermittently along a length of the rollable optical fibre ribbon, wherein the matrix material has secant modulus of 49 mega-Pascal at strain of 2.5% and water resistant property, wherein the cured coating of the matrix material with 250 micron film absorbs 3% of water in 24 hours, wherein pitch of the rollable optical fibre ribbon is 250 microns.

2. The rollable optical fibre ribbon as claimed in claim 1, wherein the matrix material of the rollable optical fibre ribbon is applied in a form of a liquid coating, wherein the liquid coating of the matrix material over the plurality of optical fibres of the rollable optical fibre ribbon has at least one of:
viscosity of 9900 milli-Pascal second at temperature of 25 degree Celsius,
density of 1110 kilogram per cubic meter at temperature of 23 degree Celsius.

3. The rollable optical fibre ribbon as claimed in claim 1, wherein a liquid coating of the matrix material is cured by exposure of the matrix material to ultraviolet radiation to form a cured coating of the matrix material.

4. The rollable optical fibre ribbon as claimed in claim 1, wherein the matrix material has at least one of:
glass transition temperature of −18 degree Celsius at pressure of 1000 mega-Pascal,
glass transition temperature of −28 degree Celsius at pressure of 100 mega-Pascal,
degree of cure of 0.5 at ultraviolet radiation of 95% of secant modulus.

5. The rollable optical fibre ribbon as claimed in claim 1, wherein the matrix material has at least one of:
   75 micron film that produces 0.2 micro liter per gram hydrogen in air at temperature of 80 degree Celsius.

6. The rollable optical fibre ribbon as claimed in claim 1, wherein the matrix material has at least one of:
   viscosity in a range of 10000 milli-Pascal second to 12000 milli-Pascal second at a first temperature range of 20 degree Celsius to 30 degree Celsius,
   viscosity in a range of 0 milli-Pascal second to 2000 milli-Pascal second at a second temperature range of 50 degree Celsius to 60 degree Celsius.

7. The rollable optical fibre ribbon as claimed in claim 1, wherein the matrix material has constant cure speed at ultraviolet radiation in a range of 0.5 joule per square centimeter to 1 joule per square centimeter.

8. The rollable optical fibre ribbon as claimed in claim 1, wherein the matrix material is a curable ultraviolet acrylate.

* * * * *